(12) United States Patent
Wang et al.

(10) Patent No.: US 10,887,222 B2
(45) Date of Patent: Jan. 5, 2021

(54) SERVICE PATH IDENTIFIER ALLOCATION IN SERVICE INSERTION (71) Applicant: VMware, Inc., Palo Alto, CA (US)

(72) Inventors: Ziyou Wang, Beijing (CN); Li Sun, Sunnyvale, CA (US); Anuprem Chalvadi, Sunnyvale, CA (US); Yanjun Lin, Sunnyvale, CA (US); Yang Ping, San Jose, CA (US); Mary Firenze, Los Altos, CA (US); Pierluigi Rolando, Santa Clara, CA (US); Yong Feng, Sunnyvale, CA (US); Raju Koganty, San Jose, CA (US); Jianjun Shen, Redwood City, CA (US); Medhavi Dhawan, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/382,002

(22) Filed: Apr. 11, 2019

(65) Prior Publication Data
US 2020/0328967 A1 Oct. 15, 2020

(51) Int. Cl.
H04L 12/717 (2013.01)
G06F 9/455 (2018.01)
H04L 12/707 (2013.01)

(52) U.S. Cl.
CPC .......... H04L 45/42 (2013.01); G06F 9/45558 (2013.01); H04L 45/24 (2013.01); G06F 2009/45595 (2013.01)

(58) Field of Classification Search
CPC .. H04L 45/306; H04L 12/1403; H04L 43/028
See application file for complete search history.

(56) References Cited

U.S. PATENT DOCUMENTS

| 2015/0063102 | A1* | 3/2015 | Mestery | H04L 41/50 370/230 |
| 2015/0071285 | A1* | 3/2015 | Kumar | H04L 45/306 370/392 |
| 2016/0014016 | A1* | 1/2016 | Guichard | H04L 45/64 709/226 |
| 2016/0119226 | A1* | 4/2016 | Guichard | H04L 45/306 370/392 |

* cited by examiner

Primary Examiner — Sm A Rahman
Assistant Examiner — Emad Siddiqi
(74) Attorney, Agent, or Firm — Adeli LLP (57) ABSTRACT Some embodiments provide a method for assigning different service path identifiers to each of a set of different service paths along each of which a same set of service operations are performed on a set of packets. The method retrieves an available service path identifier from an identifier storage that stores service path identifiers for multiple service paths. The method generates a set of proposed service path identifiers based on the retrieved available service path identifier and the number of service paths in the set of service paths. The method performs a write operation on the identifier storage based on the set of proposed service path identifiers, and based on a determination that the write operation was successful, assigns the set of proposed service path identifiers to the set of service paths. Based on the set of service path identifiers, the method forwards the set of packets along the set of service paths.

25 Claims, 8 Drawing Sheets

SERVICE PATH IDENTIFIER ALLOCATION IN SERVICE INSERTION

BACKGROUND

In a datacenter, service insertion refers to the adding of network services (e.g., firewalls, load balancers, etc.) into the forwarding path of data traffic. Service chaining builds on service insertion by allowing the linkage of multiple inserted services in a prescribed manner. The path along which the data traffic flows is called the service path, which indicates a fixed sequence of nodes (e.g., service virtual machines) that perform sequential service operations on packets in these flows. For scalability, multiple service virtual machines may provide the same service, resulting in many possible service paths for a given service chain. Since there are potentially many hundreds or thousands of service paths associated with the service chains, each service path requires a globally unique identifier. Therefore, scalable techniques for allocating identifiers are needed.

BRIEF SUMMARY

Some embodiments of the invention provide a novel technique for allocating unique service path identifiers to service paths traversed by data packets, along which a number of service operations (referred to as a service chain) are performed at service nodes along the path on each packet. Examples of service operations in some embodiments include firewall services, load balancing services, intrusion detection and prevention (IDP) services, encryption services, monitoring services, or any number of other middlebox services. Since multiple service nodes (e.g., service virtual machines or SVMs) may provide a particular service, multiple service paths may exist for a given service chain. Each service path requires a unique service path identifier, which is used to determine the next hop for forwarding data packets from service node to service node along their paths. In some embodiments, an identifier storage is used to store service path identifiers corresponding to many different service chains, each of which has potentially hundreds of service paths.

In some embodiments, the service paths are computed by a cluster of service controllers. Computation of service paths corresponding to different service chains may be sharded for scalability across multiple controllers in a central control plane (CCP) cluster. Each controller computes all the possible service paths for each of its assigned service chains. In some embodiments, the controller performs the allocation process for the service paths it computes for its assigned chains. Because service chains are sharded across controllers, the allocation of SPIs is distributed across the controllers, which perform the allocation process independently from each other.

In some embodiments, the service identifier storage is a database that is shared between all the controllers in order to ensure that each service path identifier is globally unique across all service paths corresponding to all service chains computed by all service controllers. In some embodiments, the identifier storage is a distributed shared log system, such as Corfu DB.

The allocation process begins in some embodiments by retrieving an available service path identifier (SPI) from the identifier storage. In some embodiments, the SPIs are monotonically increasing integer values, and the available identifier retrieved from the identifier storage is the lowest unused integer value that has not yet been allocated to a service path. In some embodiments, the available SPI value is referred to as the cursor value.

Based on the cursor value, and the number of service paths for which identifiers need to be allocated, a group of proposed SPIs are generated. In some embodiments the range of proposed SPIs will begin with the cursor value, and a new proposed cursor value will be computed that is equal to the retrieved cursor value plus the number of requested identifiers. In some embodiments, there are no gaps between the proposed SPIs.

Using the computed proposed SPIs, a write operation is attempted on the identifier storage. In some embodiments, the write operation attempts to write the proposed cursor value into the identifier storage. A single write operation is sufficient in some embodiments regardless of the number of SPIs. If the write operation was successful, then the proposed identifiers are assigned to the service paths. If the write operation was not successful, then the allocation process begins anew.

In some embodiments, determining that the write operation was successful or unsuccessful includes a second request for retrieving a new cursor value from the identifier storage. If the new retrieved cursor value matches the computed cursor value, the write operation was successful. This indicates that the proposed SPIs were available and unused prior to the write operation, and that the identifier storage has persisted the cursor to reflect that the proposed SPIs have been allocated as requested. In some embodiments, the cursor value is used conjunctively with a version number that is updated by the identifier storage, to further ensure that the write operation was successful.

If the new retrieved cursor value does not match the computed cursor value, the write operation was not successful. This indicates that some or all of the proposed SPIs were allocated in the time interval between requesting the initial cursor and attempting to write the proposed cursor. As a result, the identifier storage has persisted the cursor to reflect the intervening allocation of the contended SPIs. In some embodiments, the process uses the new retrieved cursor value to restart the allocation process again and compute a new group of proposed SPIs.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Some embodiments of the invention provide a novel technique for allocating unique service path identifiers to service paths traversed by data messages (e.g., data packets), along which a number of service operations (referred to as a service chain) are performed at service nodes along the path on each packet. The data messages originate at a source machine and are directed through a network to a destination virtual machine, for example as guest/tenant virtual machines or containers executing on host computers located in one or more datacenters. A guest forwarding plane connects the guest machines and performs L2 and/or L3 forwarding for them. A service forwarding plane connects to the service nodes and forwards the data messages between them along the service path. In some embodiments, the guest forwarding plane and the service forwarding plane are implemented by software forwarding elements executing on the host computers. The data messages are intercepted between the source and destination machines by proxy modules executing on the host computers and diverted along the service paths for processing by service nodes along the service chain before being delivered their destination.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Further, the terms end machine and virtual machine (VM) may be used herein to refer to any instance of a data compute node (DCN) that operates in virtualization software, including VMs and containers that execute within VMs. While the examples below refer to virtual machines, it should be understood that the invention should not be limited to any specific type of DCN.

Figure 1:
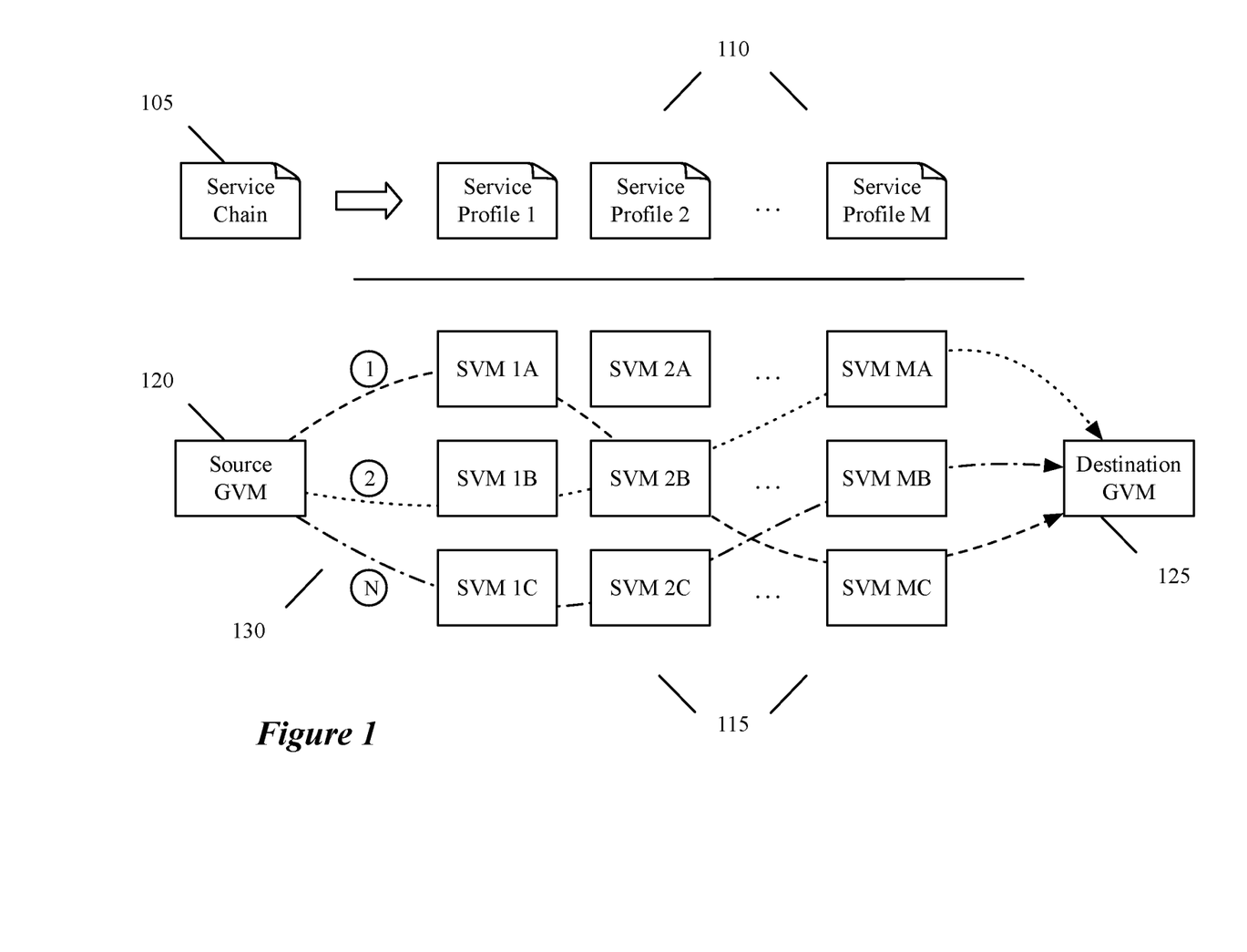
FIG. 1 conceptually illustrates an example of a service chain and its associated service path.

An example of a service chain and its associated service path is conceptually illustrated in FIG. 1. A service chain 105 is defined as a sequential list of service profiles 110, each of which is used to configure service nodes (e.g., service virtual machines or SVMs) 115 to provide a service operation. Examples of service operations in some embodiments include firewall services, load balancing services, intrusion detection and prevention (IDP) services, encryption services, monitoring services, or any number of other middlebox services. In some embodiments, the services may also include third-party services provided by edge nodes, at the network edge of the datacenter. More than one SVM may execute in some embodiments on the same service host computer or edge node.

In the simplified example of FIG. 1, there are M different service profiles in the service chain 105, and each service profile 110 is implemented by different SVMs 115. In practice, the number of SVMs that provide different services will vary from service profile to service profile, depending on the type of service, bandwidth and resource constraints, processing power, network configuration, access policies, and other factors. In addition, a given SVM may be configured to perform more than one service operation by more than one service profile 110. Even though each SVM for each service profile 110 is represented as a separate entity in FIG. 1, in some embodiments multiple SVMs may execute within the same container or virtual machine.

Since more than one SVM 115 may provide a given service operation, multiple service paths 130 exist for a given service chain. In the example of FIG. 1, there are N service paths associated with the service chain 105, traversed by packets originating at source GVM 120 and destination GVM 125. The first service path is indicated by the dashed line, along which packets are processed by SVM 1A for the first service operation, SVM 2B for the second service operation, and SVM MC for the Mth service operation in the service chain 105. The second service path is indicated by the dotted line, along which packets are processed by SVM 1B for the first service operation, SVM 2B for the second service operation, and SVM MA for the Mth service operation in the service chain 105. The Nth service path is indicated by the dot-dash line, along which packets are processed by SVM 1C for the first service operation, SVM 2C for the second service operation, and SVM MB for the Mth service operation in the service chain 105. As the example illustrates, different service paths may cross at the same SVM for a given service operation. In this example, service paths 1 and 2 both traverse SVM 2B. However, regardless of which service path a given packet travels, the same set of service operations is performed in the same sequence for all paths that associated with the same service chain 105.

In some embodiments, service paths are computed from multiple service chains by a central control plane (CCP) cluster of service controllers. The computation of service paths corresponding to different service chains are sharded in some embodiments for scalability across multiple controllers in the cluster. Each controller computes all the possible service paths for each of its assigned service chains.

In some embodiments, the controller also performs the allocation process for the service path identifiers (SPIs) it computes for its assigned chains. Because service chains are sharded across controllers, the allocation of SPIs is distributed across the controllers, which perform the allocation process independently from each other. Each service path requires a unique service path identifier. In some embodiments, the service path identifier is used to determine the next hop for forwarding data packets between SVMs along their service paths.

Figure 2:
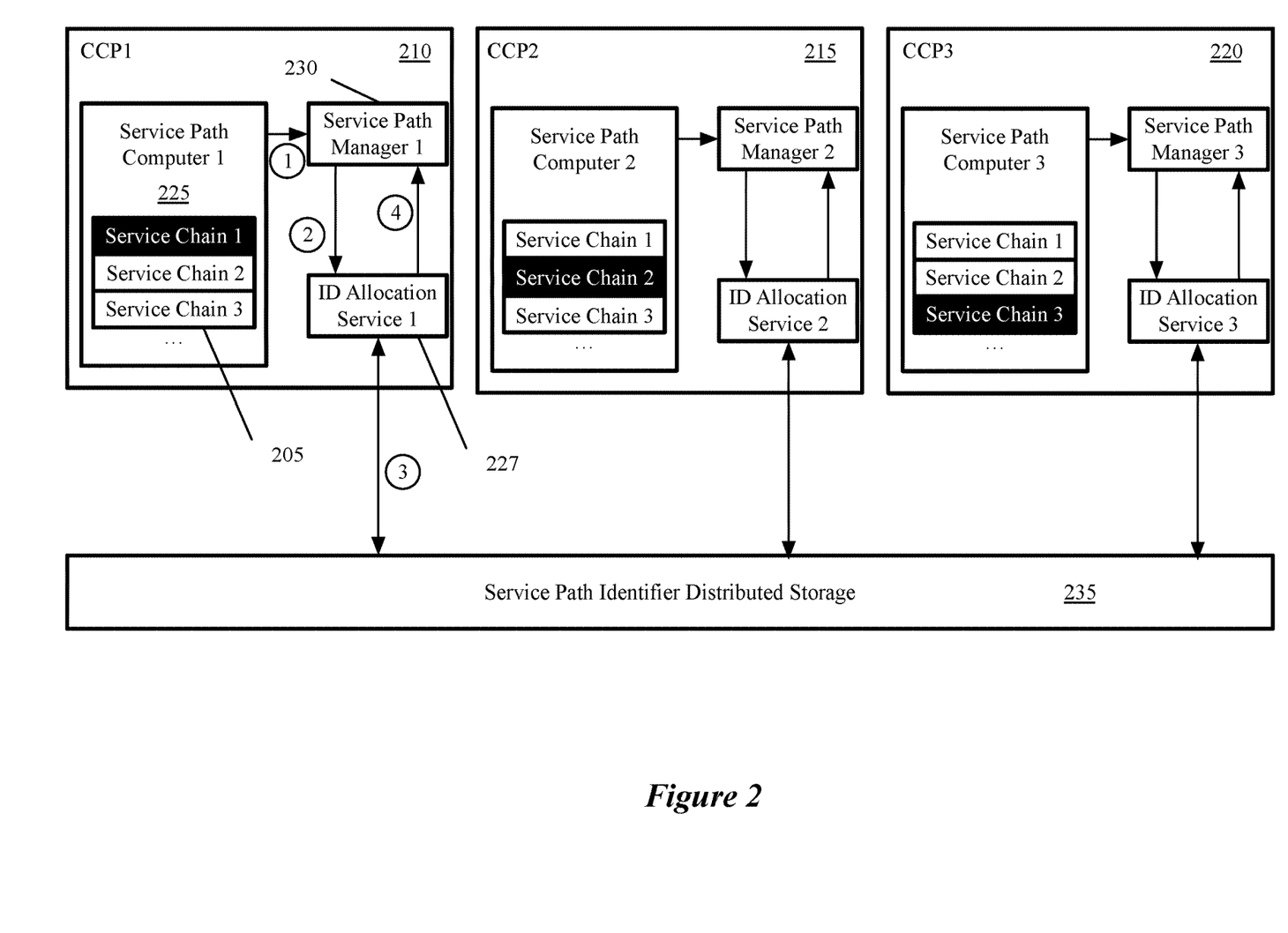
FIG. 2 conceptually illustrates an example of a CCP cluster for computing the service paths and allocating service path identifiers.

An example of a CCP cluster for computing the service paths and allocating SPIs is illustrated in FIG. 2. Each controller 210-220 has a service path computer 225 for computing the service paths, an ID allocation service 227 for requesting service path identifiers (SPIs) from an identifier storage database 235, and a service path manager 230 that consumes the SPIs and uses them to configure the host computers on which the GVMs and SVMs execute.

In some embodiments, the service path identifier storage 235 is used to store service path identifiers corresponding to many different service chains, each of which has potentially hundreds of service paths. In some embodiments, the service identifier storage 235 is a database that is shared between all the controllers 210-220 in order to ensure that each service path identifier is globally unique across all service paths corresponding to all service chains computed by all service controllers. For example, the identifier storage 235 in some embodiments is implemented as a distributed shared log system, such as Corfu DB. The distributed nature of such a system permits allocation of SPIs to different service paths computed from different service chains by different controllers without any gaps or waste on SPI values, as will be described in further detail below.

Figure 3:
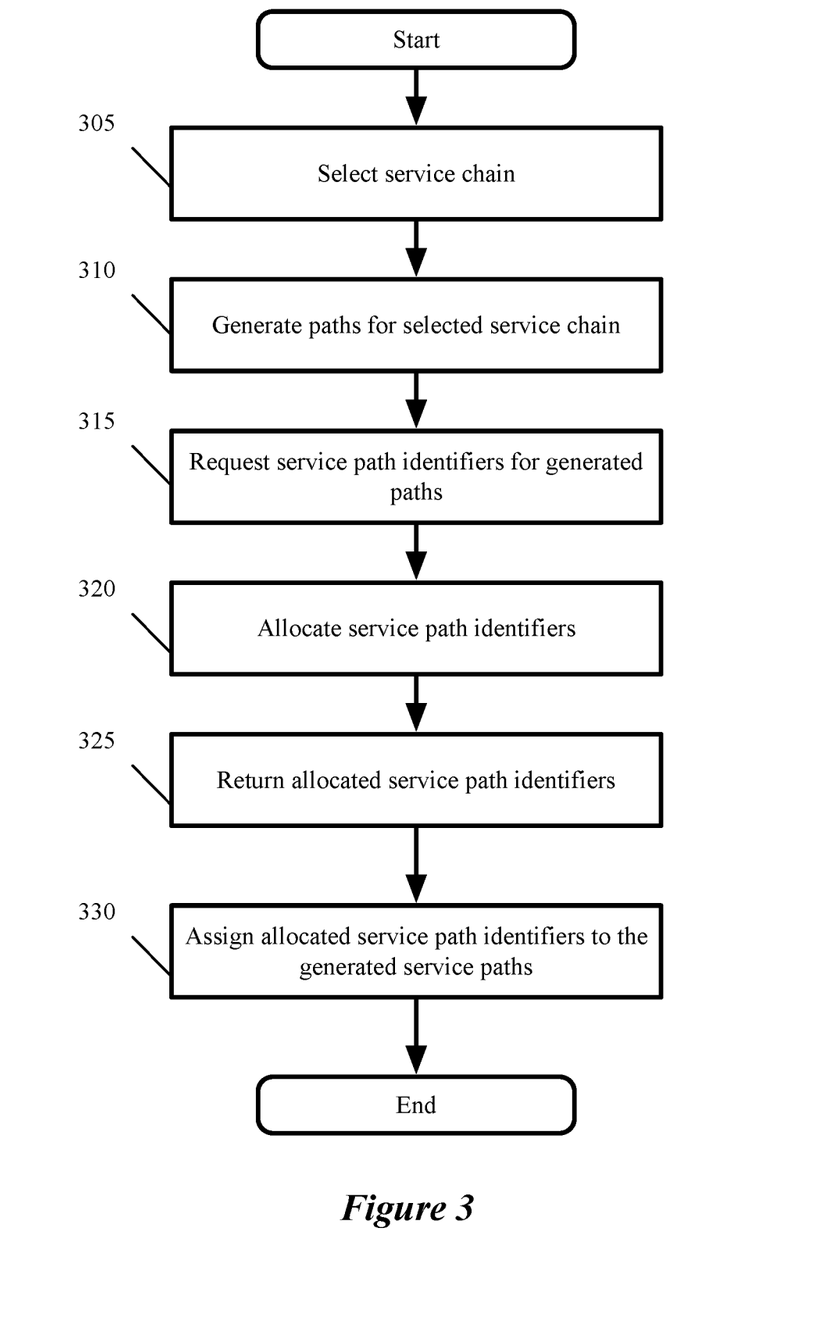
FIG. 3 conceptually illustrates a process performed in some embodiments by a controller for allocating service path identifiers.

FIG. 3 conceptually illustrates a process 300 performed in some embodiments by the controller 210 in the control cluster illustrated in FIG. 2. These operations are performed in parallel in some embodiments by all the active controllers 210-220 in the cluster. The process 300 begins by selecting at 305 an assigned service chain 105 for processing. As noted above, all the available service chains are sharded across the controllers 210-220, for example by round-robin or load-balancing techniques.

The process 300 generates at 310 all the service paths 130 associated with the selected service chain 105. In some embodiments, the paths are generated by computing all possible paths between SVMs that implement the service operations defined by the service profiles 110 in the service chain 105. The computation may be performed in some embodiments by a dedicated service path computer 225.

The possible paths may be constrained by memory, network topography, service types, policies, resources, and other factors that are taken into account by the service path computer 225. In some embodiments, a service chain 105 may yield 1000-4000 service paths 130. In some embodiments, the service paths 130 are delivered after computation from the service path computer 225 to the service path manager 230. This handoff is represented in FIG. 2 by the encircled number 1.

After generating the service paths, the process 300 requests at 315 unique service path identifiers (SPIs) for the generated paths 130. In some embodiments, the request is made from the service path manager 230, after receiving the generated service paths 130 from the service path computer 225. The request includes in some embodiments the number of service paths that require SPIs. The request is received in some embodiments by the ID allocation service 227 and is represented in FIG. 2 by the encircled number 2.

After receiving the allocation request, the process 300 performs at 320 the SPI allocation by making an allocation request to the identifier storage 235. In some embodiments, the allocation is performed by the ID allocation service 227, which requests globally unique SPIs from the identifier storage 235 until it succeeds, as will be described in further detail below with reference to FIG. 4. The allocation is represented in FIG. 2 by the encircled number 3.

After receiving the allocated SPIs from the identifier storage 235, the process 300 then returns at 325 the allocated identifiers. In some embodiments, the allocated SPIs are provided to the service path manager 230, as represented in FIG. 2 by the encircled number 4.

The service path manager 230 then assigns at 330 the allocated SPIs to the generated service paths. In some embodiments, the service path manager 230 supplies the allocated SPI to the host computers for consumption. The host computers host guest virtual machines (GVMs) which are the sources and destination of the packets, and the managers provide mappings to the SVMs between service chain identifiers and service profiles that indicate what services the SVMs are to provide. The SPIs are incorporated into the network service headers (NSH) of the data packets and are used in some embodiments to determine the next hop for packets as they progress along the service chain 105 from SVM to SVM. The process 300 then ends.

Figure 4:
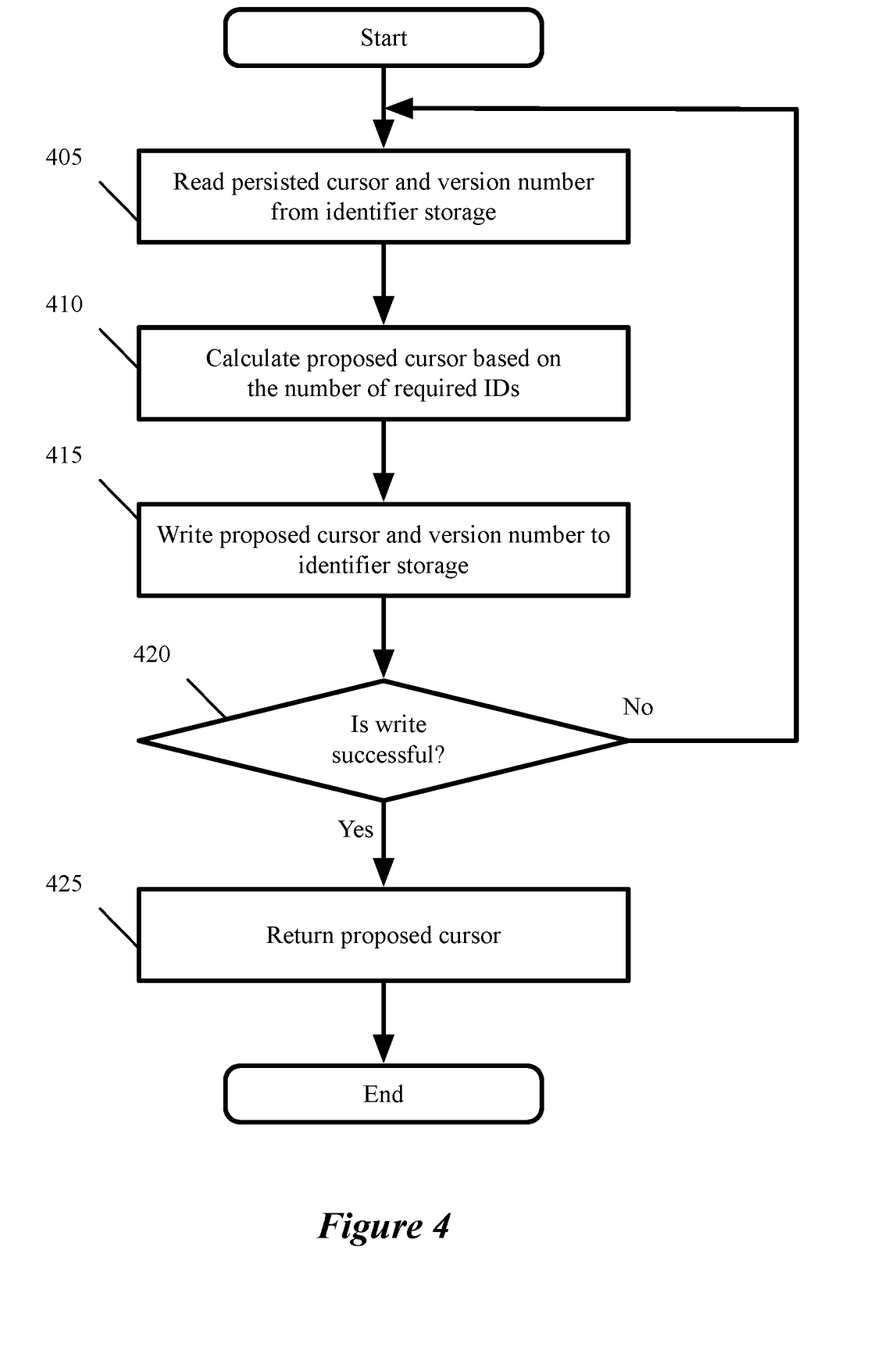
FIG. 4 conceptually illustrates a process performed by an ID allocation service.

FIG. 4 illustrates a process 400 performed by the ID allocation service 227 in some embodiments. The allocation process begins at 405 by retrieving an available service path identifier (SPI) from the identifier storage 235. In some embodiments, the SPIs are monotonically increasing integer values, and the available identifier retrieved from the identifier storage 235 is the lowest unused integer value that has not yet been allocated to a service path. In some embodiments, the available SPI value is referred to as the persisted cursor value, because it represents the persistent value from all previous SPI allocations.

In some embodiments, the process 400 also reads a version number assigned by the identifier storage 235 to the proposed cursor 525. This version number is updated by the identifier storage whenever a cursor is modified. In some embodiments, this version number is guaranteed to be different every time the cursor is updated in the identifier storage 235.

The process 400 uses the persisted cursor value, and the number of service paths for which SPIs need to be allocated, to calculate at 410 a group of proposed service path identifiers, beginning with the persisted cursor value. In some embodiments, a new proposed cursor value is computed at 410 that is equal to the persisted cursor value plus the number of required identifiers. In some embodiments, hundreds or thousands of service path identifiers may need to be allocated at once.

Figure 5:
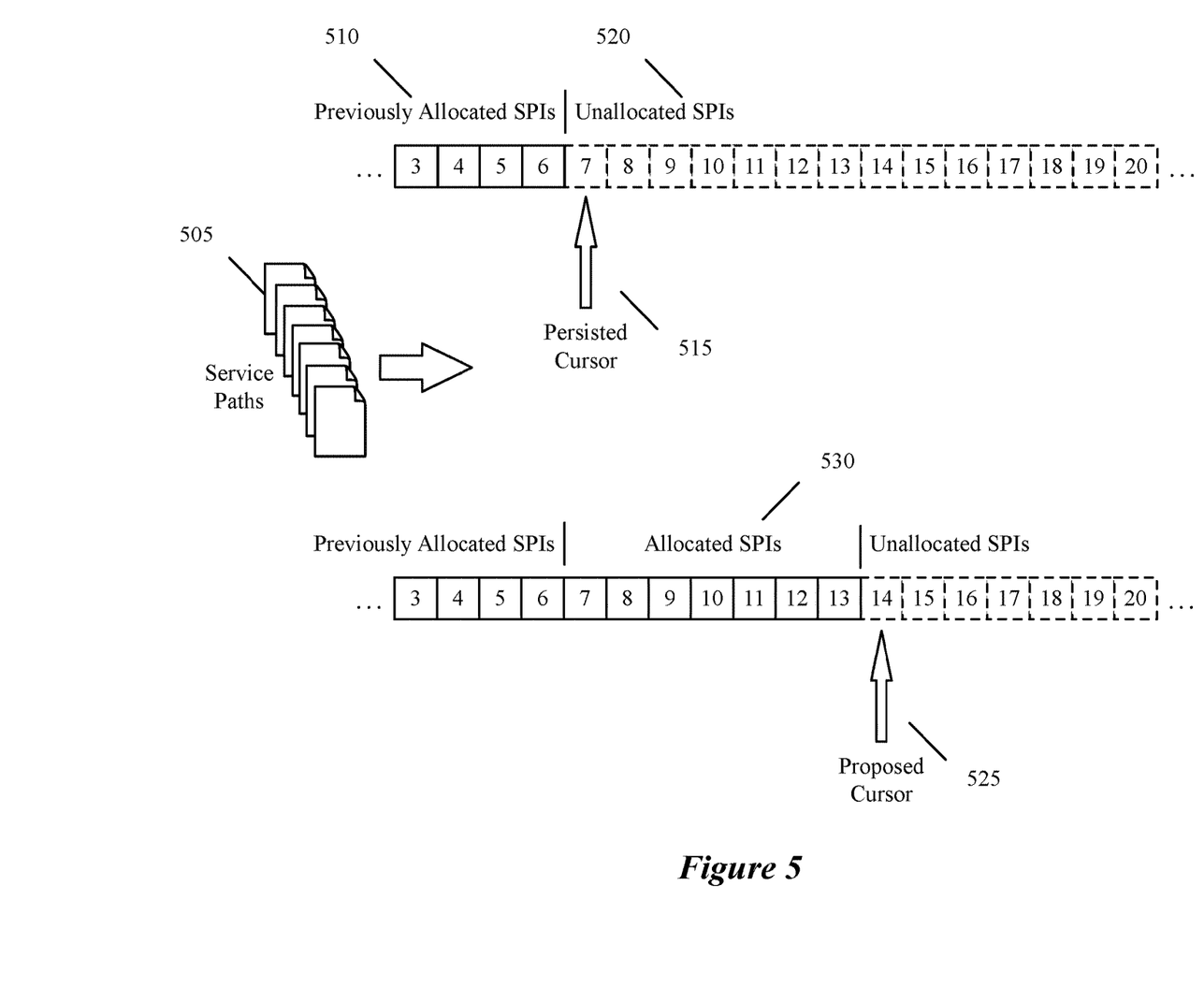
FIG. 5 conceptually illustrates an example of calculating the proposed cursor value.

FIG. 5 conceptually illustrates an example of calculating the proposed cursor value. In this simplified example, the controller 210 requires SPIs for 7 service paths 505. Prior to the allocation request, SPIs 510 up to a value of 6 have previously been allocated in the identifier storage 235 to other service paths. The persisted cursor 515 is therefore equal to the value of 7, which represents the next available identifier value in the unallocated SPIs 520 in the identifier storage 235. The controller 210 requires SPIs for seven service paths 505, so therefore it computes a proposed cursor 525 value of persisted cursor 515+number of paths 505=7+7=14. The proposed cursor 525 value of 14 therefore represents the new lowest unallocated SPI value after allocating SPIs 530 for the controller's current request.

Returning to FIG. 4, the process 400 attempts at 415 a write operation of the calculated proposed cursor value 525 to the identifier storage 235. In some embodiments, the process 400 also attempts to write at 415 the same version number that was read earlier with the persisted cursor in step 405. As the example of FIG. 5 illustrates, a single write operation is sufficient for all requested SPIs in some embodiments, since the proposed cursor value 525 already takes into account the persisted cursor value 515 previously read from the identifier storage 235 and the number of requested SPIs. Therefore, the cost in resources to allocate a single SPI is the same as the cost to allocate thousands of SPIs. This is because in such embodiments, the range of SPIs is monotonically increasing and there are no gaps in the allocated identifiers.

The process 400 then determines at 420 whether the write operation was a success. If the write operation was successful, then the proposed identifiers are returned at 425 to the service path manager 230 and assigned to the generated service paths. The process 400 then ends.

Failure of the write operation indicates that some or all of the proposed SPIs were allocated in the time interval between requesting the initial cursor and attempting to write the proposed cursor. If the write operation was not successful, then the allocation process begins anew by returning to 405 and continues until allocation is a success.

In some embodiments, the identifier storage 235 returns success or failure of the write operation, because the identifier storage is a distributed shared log system (e.g., Corfu DB) that guarantees that only a single controller can perform a write operation successfully at any given time. If multiple controllers propose a new cursor at the same time, then the integer storage only accepts one proposal, meaning that one controller will win, and the other controllers will fail. The winning controller will receive a confirmation that the write operation succeeded and it can use the proposed SPIs. The other controllers will be notified that their write operations failed and will need to re-propose new SPIs based on the persisted cursor updated by the winning controller.

In some embodiments, the identifier storage 235 only returns a write success when two conditions are met. First, the proposing controller 210 wins the competition to write the proposed cursor. In addition, the version number that the controller 210 provides along with the proposed cursor must also match the current (e.g., the most recent) version number stored in the identifier storage 235. Even if the proposing controller 120 wins the competition to write to the identifier storage, the write operation will still fail if the version numbers do not match.

Figure 6:
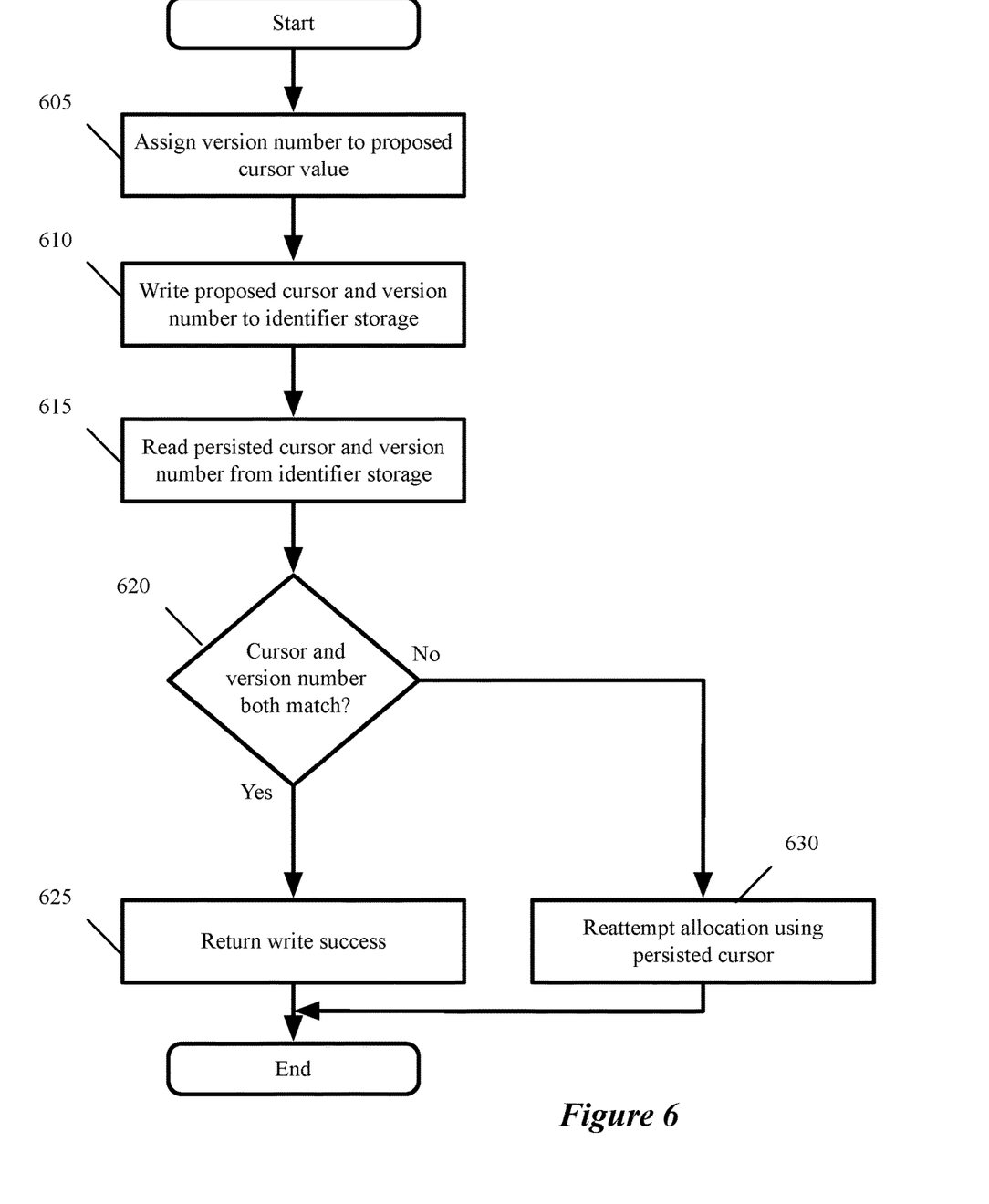
FIG. 6 illustrates a process performed by a controller to assign and use version numbers to the proposed cursor.

In some embodiments, the controller assigns the version number instead of the identifier storage. Such embodiments do not use a distributed shared log system such as Corfu DB. FIG. 6 illustrates a process 600 performed by a controller to assign and use version numbers to the proposed cursor in such embodiments. This process may in some embodiments be part of operation 415 from FIG. 4. This process is performed in some embodiments by the ID allocation service 227.

The process 600 begins by assigning at 605 a version number to the proposed cursor value 525 (e.g., the cursor value previously calculated in 410). In some embodiments, the version number is a random number, such as a Universally Unique Identifier (UUID). The process 600 then attempts to write at 610 both the proposed cursor value and the assigned version number to the identifier storage.

The process 600 then reads at 615 the persisted cursor 515 and the latest version number from the identifier storage 235. The process 600 then compares at 620 the value of the newly-read persisted cursor to the value of the proposed cursor 525, and the value of the assigned version number to the value of the newly-read version number. In some embodiments, the process 600 only needs to compare at 620 the version number values, since these are unique to the proposed cursor value.

If the cursor values and/or the version numbers match, the write operation is verified as successful. This indicates that the requested SPIs were available and unallocated prior to the write operation, the proposed SPIs have been allocated as requested, and the identifier storage 235 has persisted the cursor accordingly, as in the example illustrated in FIG. 5. The process 600 accordingly returns at 625 an indication of write success to the service path manager 230, and the process ends.

If the cursor values and/or the version numbers do not match, then the write operation cannot be verified as successful. In some embodiments, the cursors do not match because the identifier storage 235 has persisted the cursor to reflect an intervening allocation of the contended SPIs. The process 600 accordingly reattempts at 630 the allocation using the newly read persisted cursor, in some embodiments by invoking process 400. The process 600 then ends.

Figure 7:
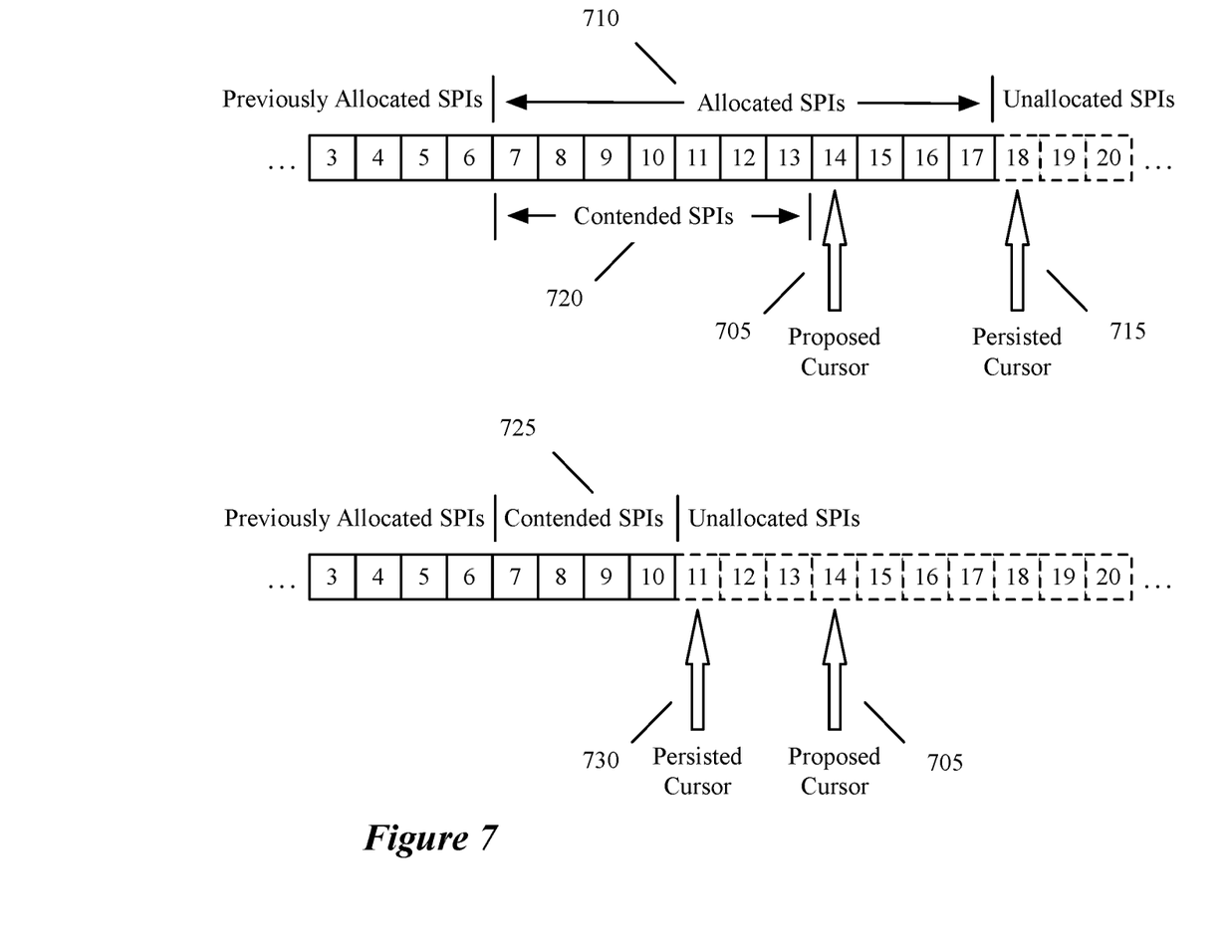
FIG. 7 conceptually illustrates scenarios where the write operation fails.

FIG. 7 conceptually illustrates two scenarios where the write operation fails and/or cannot be verified, continuing the example of FIG. 5. In that example, the controller 210 desires to allocate SPIs for 7 service paths 505 and has already read (at 405) the persisted cursor 515 from the identifier storage 235 as having a value of 7. Therefore, the computed value of the proposed cursor 705 is 7+7=14.

In the first scenario (top), a second, different controller (e.g., 215) has successfully allocated SPIs 710 for 11 service paths in the interval between the first controller's initial reading 405 of the persisted cursor and the attempted write operation 415. Therefore, the persisted cursor 715 after the allocation of SPIs for the second controller is now 11+7=18. The proposed cursor value 705 points to a contended SPI value that has already been allocated. The SPIs 720 are referred to as contended SPIs since these SPI values (e.g., 7-13) are in contention between controllers 210 and 215. When the controller 215 attempts to write the proposed cursor value, in some embodiments the identifier storage will return a write failure error, since the proposed cursor value is already occupied by an allocated SPI.

In the second scenario (bottom), the second controller 215 has successfully allocated SPIs 725 for 4 service paths in the interval between the first controller's initial reading 405 of the persisted cursor and the attempted write operation 415. Therefore, the persisted cursor 730 after the allocation of SPIs for the second controller is now 4+7=11. In this scenario, all of the SPIs 725 allocated to the other controller 215 are contended SPIs. The proposed cursor value 705 does not point to a contended SPI, so when the controller 215 attempts to write the proposed cursor value, in some embodiments the identifier storage 235 will return success, since the proposed cursor value is not occupied by an allocated SPI. However, when the controller attempts to verify the write operation by comparing the cursor values, there will be a discrepancy. This discrepancy indicates that there is a gap of unallocated SPIs between the persisted cursor 730 and the proposed cursor 705, which are wasted SPIs. Therefore, this allocation is not optimal, and in some embodiments the controller will reattempt SPI allocation (e.g., operation 620) so that there is no gap.

In some embodiments, the identifier storage 235 itself detects the discrepancy between the proposed cursor and the current persistent cursor value. In these embodiments, the storage refuses the allocation in order to avoid having an SPI gap, and returns a write failure notice to the controller 210.

In both scenarios, the number of SPIs allocated to the second controller differs from the number requested by the first controller, which is why the originally-read persisted cursor value does not match the proposed cursor value from the first controller. In general, due to the very large number of service paths (potentially hundreds or even thousands) that must be allocated at any given time for a service chain, it is very unlikely that two controllers would request allocation of SPIs for the same number of service paths, since as noted above different service chains are sharded to different controllers. However, even if the number of paths were the same, then the identifier storage 235 would still only accept one write operation and return failure to the other.

Since the controllers 210-220 perform SPI allocation independently of each other, they do not need to be aware of the existence and the number of their peers. This is an advantage over methods that select one controller as a master controller for SPI allocation. Furthermore, there is no unbalanced SPI allocation problem across different nodes, since there is only a single cursor for the identifier storage 235. This is in contrast to each controller using different start cursors and the same fixed step on different SPI allocation instances.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
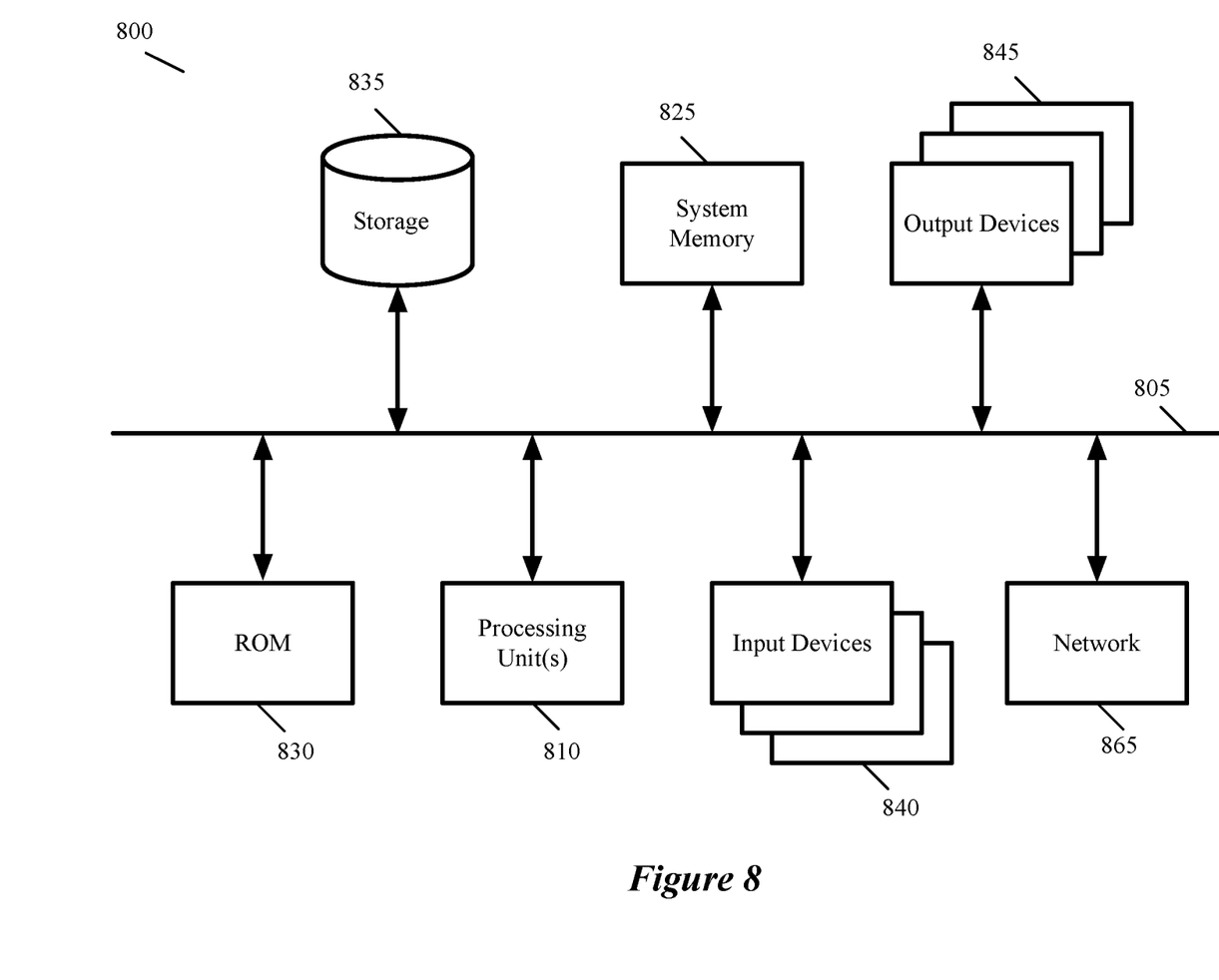
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for providing different service path identifiers to different service path allocators, each service path identifier associated with a service chain that includes a set of service operations to be performed on a set of packets, the method comprising:
at a particular service path allocator:
from an identifier storage that stores available service path identifiers, obtaining a next available service path identifier;
generating a set of proposed service path identifiers for a particular service chain based on (i) the obtained next available service path identifier and (ii) a number of service paths needed to be defined for the particular service chain, each service path identifier in the set of proposed service path identifiers specifying a different set of machines for implementing the set of service operations of the particular service chain;
based on the generated set of proposed service path identifiers, directing the identifier storage to perform a write operation in order to ensure that none of the proposed service path identifiers have been obtained by another service path allocator as the next available service path identifier for that service path allocator;
based on a determination that the write operation was successful, assigning the set of proposed service path identifiers to the set of service paths; and
based on the set of service path identifiers, forwarding the set of packets along the set of service paths.

2. The method of claim 1, wherein the available service path identifiers are monotonically increasing integer values, wherein the next available service path identifier obtained from the identifier storage is a lowest unused integer value that has not yet been allocated to a service path.

3. The method of claim 2, wherein the next available service path identifier is a first next available service path identifier, wherein generating the set of proposed service path identifiers comprises calculating a second next available service path identifier.

4. The method of claim 3, wherein calculating the second next available service path identifier comprises adding the first next available service path identifier to the number of service paths needed to be defined for the particular service chain.

5. The method of claim 3, wherein the determination that the write operation was successful comprises:
from the identifier storage, receiving a notification that the write operation was successful; and
verifying the successful write operation.

6. The method of claim 5, wherein verifying the successful write operation comprises:
from the identifier storage, obtaining a third next available service path identifier; and
determining that the third next available service path identifier is equal to the second next available service path identifier.

7. The method of claim 3, wherein the service chain is a first service chain, the method further comprising:
from the identifier storage, obtaining the second next available service path identifier;
generating a second set of proposed service path identifiers for a second service chain based on (i) the obtained second next available service path identifier and (ii) a second number of service paths needed to be defined for the second service chain;

based on the second generated set of proposed service path identifiers, directing the identifier storage to perform a second write operation; and receiving, from the identifier storage, a notification that the write operation was not successful.

8. The method of claim 7 further comprising:

from the identifier storage, obtaining a third next available service path identifier;

generating a third set of proposed service path identifiers for the second service chain based on (i) the obtained third next available service path identifier and (ii) the second number of service paths; and directing the identifier storage to perform a third write operation based on the third set of proposed service path identifiers.

9. The method of claim 1, wherein the method is performed by a controller in a set of controllers, wherein the set of service operations are performed on each packet by a set of service machines associated with the set of service paths and executing on a plurality of host computers, wherein each service operation is performed by at least one service machine.

10. The method of claim 9, wherein the set of packets originate at a source machine executing on a first host computer and are destined for a destination machine executing on a second host computer.

11. The method of claim 9, wherein each controller in the set of controllers defines a different set of service paths associated with a different set of operations in a plurality of different sets of service operations.

12. The method of claim 11, wherein the identifier storage is a distributed database shared between all the controllers in the set of controllers and storing all the service path identifiers for each set of service paths.

13. The method of claim 1, wherein the set of service operations comprise at least one of a firewall service, a load balancer service, and an intrusion detection and prevention (IDP) service.

14. The method of claim 1, wherein the write operation on the identifier storage is a single write operation.

15. A non-transitory machine readable medium storing a particular service path allocator for providing different service path identifiers to different service path allocators, each service path identifier associated with a service chain that includes a set of service operations to be performed on a set of packets, the particular service path allocator comprising sets of instructions for:

obtaining a next available service path identifier from an identifier storage that stores available service path identifiers;

generating a set of proposed service path identifiers for a particular service chain based on (i) the obtained next available service path identifier and (ii) a number of service paths needed to be defined for the particular service chain, each service path identifier in the set of proposed service path identifiers specifying a different set of machines for implementing the set of service operations of the particular service chain;

directing, based on the generated set of proposed service path identifiers, the identifier storage to perform a write operation in order to ensure that none of the proposed service path identifiers have been obtained by another service path allocator as the next available service path identifier for that service path allocator;

based on a determination that the write operation was successful, assigning the set of proposed service path identifiers to the set of service paths; and based on the set of service path identifiers, forwarding the set of packets along the set of service paths.

16. The non-transitory machine readable medium of claim 15, wherein the available service path identifiers are monotonically increasing integer values, wherein the next available service path identifier obtained from the identifier storage is a lowest unused integer value that has not yet been allocated to a service path.

17. The non-transitory machine readable medium of claim 16, wherein the next available service path identifier is a first next available service path identifier, wherein the set of instructions for generating the set of proposed service path identifiers comprises a set of instructions for calculating a second next available service path identifier.

18. The non-transitory machine readable medium of claim 17, wherein the set of instructions for calculating the second next available service path identifier comprises a set of instructions for adding the first next available service path identifier to the number of service paths needed to be defined for the particular service chain.

19. The non-transitory machine readable medium of claim 17, wherein the particular service path allocator further comprises sets of instructions for:

receiving a notification that the write operation was successful from the identifier storage; and verifying the successful write operation.

20. The non-transitory machine readable medium of claim 19, wherein the set of instructions for verifying the successful write operation comprises sets of instructions for:

obtaining a third next available service path identifier from the identifier storage; and determining that the third next available service path identifier is equal to the second next available service path identifier.

21. The non-transitory machine readable medium of claim 17, wherein the service chain is a first service chain, wherein the particular service path allocator further comprises sets of instructions for:

obtaining the second next available service path identifier from the identifier storage;

generating a second set of proposed service path identifiers for a second service chain based on (i) the obtained second next available service path identifier and (ii) a second number of service paths needed to be defined for the second service chain;

directing the identifier storage to perform a second write operation based on the second generated set of proposed service path identifiers; and receiving, from the identifier storage, a notification that the write operation was not successful.

22. The non-transitory machine readable medium of claim 21, wherein the particular service path allocator further comprises sets of instructions for:

obtaining a third next available service path identifier from the identifier storage;

generating a third set of proposed service path identifiers for the second service chain based on (i) the obtained third next available service path identifier and (ii) the second number of service paths; and directing the identifier storage to perform a third write operation based on the third set of proposed service path identifiers.

23. The non-transitory machine readable medium of claim 15, wherein the particular service path allocator is executed by a controller in a set of controllers, wherein the set of service operations are performed on each packet by a set of service machines associated with the set of service paths and executing on a plurality of host computers, wherein each service operation is performed by at least one service machine.

24. The non-transitory machine readable medium of claim 23, wherein each controller in the set of controllers defines a different set of service paths associated with a different set of operations in a plurality of different sets of service operations.

25. The non-transitory machine readable medium of claim 24, wherein the identifier storage is a distributed database shared between all the controllers in the set of controllers and storing all the service path identifiers for each set of service paths.

* * * * *